(12) United States Patent
Reedijk (10) Patent No.: US 12,454,799 B2
(45) Date of Patent: Oct. 28, 2025

(54) RIVER TRAINING STRUCTURE, SYSTEM COMPRISING RIVER TRAINING STRUCTURE, AND METHOD FOR TRAINING A RIVER

(71) Applicant: Koninklijke BAM Groep N.V., Bunnik (NL)

(72) Inventor: Jan Sebastiaan Reedijk, Bunnik (NL)

(73) Assignee: Koninklijke BAM Groep N.V., Bunnik (NL)

( * ) Notice: Subject to any disclaimer, the term of this patent is extended or adjusted under 35 U.S.C. 154(b) by 95 days.

(21) Appl. No.: 18/681,179

(22) PCT Filed: Aug. 6, 2021

(86) PCT No.: PCT/EP2021/072095
§ 371 (c)(1),
(2) Date: Feb. 5, 2024

(87) PCT Pub. No.: WO2023/011738
PCT Pub. Date: Feb. 9, 2023

(65) Prior Publication Data
US 2024/0279892 A1 Aug. 22, 2024

(51) Int. Cl.
*E02B 3/02* (2006.01)
*E02B 3/06* (2006.01)

(52) U.S. Cl.
CPC . *E02B 3/02* (2013.01); *E02B 3/06* (2013.01)

(58) Field of Classification Search
CPC .................................. E02B 3/02; E02B 3/06
See application file for complete search history.

(56) References Cited

U.S. PATENT DOCUMENTS

| 2,766,592 A | 10/1956 | Danel et al. |
| 3,896,624 A * | 7/1975 | Chang .................... E02B 3/129 |
| | | 405/29 |

(Continued)

FOREIGN PATENT DOCUMENTS

| GB | 2228960 A | * | 9/1990 | ............... E02B 3/04 |
| NL | 8300906 A | * | 10/1984 | ............... E02B 3/02 |

(Continued)

OTHER PUBLICATIONS

Roelof Kleis; Long Live the Longitudinal Dam; Nov. 19, 2020; Resource WUP from within https://www.resource-online.nl/index.php/2020/11/19/long-live-the-longitudinal-dam/?lang=en#:~:text=The%20longitudinal%20dams%20along%20the,therefore%20stays%20navigable%20for%20longer. (Year: 2020).*

(Continued)

*Primary Examiner* — Kyle Armstrong
(74) *Attorney, Agent, or Firm* — Hoffmann & Baron, LLP (57) ABSTRACT

A river training structure includes a longitudinal groyne placed in the river. The groyne extends in flow direction of the river with water of the river along both longitudinal sides of the groyne. The river training structure includes blocks, each block being constituted by a central part and four or more legs extending from the central part such that the central part and legs define a three-dimensional configuration allowing a multiple of said blocks to inter-engage with each other three-dimensionally when stacked onto each other. The groyne is constructed from a multiple said blocks irregularly stacked onto each other and engaging with each (Continued)

other to form a dam body of inter-engaging blocks, the dam body having a longitudinal slope at the navigation channel side of the dam body.

20 Claims, 4 Drawing Sheets

(56) References Cited

U.S. PATENT DOCUMENTS

| | | | |
|---|---|---|---|
| 4,347,017 A | | 8/1982 | Chevallier |
| 2010/0104366 A1* | | 4/2010 | Melby .................. E02B 3/129 |
| | | | 405/16 |
| 2020/0308790 A1* | | 10/2020 | Anderson .............. E02B 3/129 |

FOREIGN PATENT DOCUMENTS

| | | |
|---|---|---|
| WO | 00/56981 A1 | 9/2000 |
| WO | 2004/009910 A2 | 1/2004 |

OTHER PUBLICATIONS

Omer, Amgad et al, "Modelling the morphological effects of longitudinal dams in the Midden-Waal", Managing Changing Rivers: NCR Days 2020 Proceedings, Netherlands Centre For River Studies, 2020, p. 104-105 (XP055909556).

Xbloc, "Xstream", Apr. 23, 2021 (Apr. 23, 2021), p. 1-3, Retrieved from the Internet: URL:https://www.xbloc.com/en/our-blocks/xstream (XP055909752).

Flores, N Y et al, "Assessing Habitat Suitability for Native and Alien Freshwater Mussels in the River Waal (the Netherlands), Using Hydroacoustics and Species Sensitivity Distributions", Environmental Modeling & Assessment, Jul. 8, 2021 (Jul. 8, 2021), vol. 27, No. 1, p. 187-204 (XP037665227).

Vreugdenhil, Heleen et al, "Establishing Stakeholder Readiness for Innovation Adoption", Managing Changing Rivers: NCR Days 2020 Proceedings, Netherlands Centre for River Studies, Publication 44-2020,2020, p. 14-15, (XP055909536).

Xbloc, "Xstream", Apr. 6, 2022 (Apr. 6, 2022), p. 1-1, Retrieved from the Internet: URL:https://web.archive.org/web/20210423061250/https://www.xbloc.com/en/our-blocks/xstream (XP055909756).

* cited by examiner

RIVER TRAINING STRUCTURE, SYSTEM COMPRISING RIVER TRAINING STRUCTURE, AND METHOD FOR TRAINING A RIVER

CROSS-REFERENCE TO RELATED APPLICATIONS

This application is the National Stage of International Application No. PCT/EP2021/072095, filed Aug. 6, 2021, the contents of which is incorporated by reference herein.

FIELD OF THE INVENTION

The invention relates to the field of training rivers. More specifically the invention is directed to a river training structure, a system comprising a river training structure, and method for training a river structure and/or method for building a river training structure.

BACKGROUND OF THE INVENTION

River training is the stabilisation of the navigation channel (i.e. the part of the river to be used by shipping) in order to ensure that the navigation channel maintains a certain cross section and certain alignment. Frequently a primary objective of river training is improving navigation by maintaining a depth of the navigation channel. Further objectives of river training, in general, are: increasing the safety against flooding by accommodating a flood flow, improving efficiency of sediment transport; minimising or reducing bank erosion by stabilizing the course of the flow, directing the flow to a desired stretch.

River training structures may be grouped in a) bed fixation and bottom vanes, b) longitudinal river training structures, and c) transverse river training structures.

Perhaps the best-known example of a transverse river training structure is a groyne. Referring to Wikipedia, "A groyne (in the U.S. groin), built perpendicular to the land, is a rigid hydraulic structure built from an ocean shore (in coastal engineering) or from a bank (in rivers) that interrupts water flow and limits the movement of sediment."

Longitudinal river training structures are installed on the river banks parallel to the river course, in general with the aim to protect adjoining areas from inundation, erosion, and river meandering.

The present invention concerns a structure which is parallel to the river course but not on the bank, on the one hand, and which as a main component comprises a groyne which is parallel to the river course and not transverse to the river course, on the other hand. To avoid confusion with the term groyne which in general is considered to extend transverse to the river, whilst the groyne according to the invention extends in the flow direction of the river—for example parallel or about parallel to the river—on the other hand, here the term 'transverse groyne' will be used in relation to the conventional groyne in a transverse river training structure, and the term 'longitudinal groyne' will be used in relation to the invention in which the groyne extends in flow direction of the river.

Longitudinal groynes arranged in the river at a distance from the bank are known as such. The construction of these known longitudinal groynes is complex, time consuming, and expensive, and also hinders or obstructs shipping along the river for a long time. A conventional longitudinal groyne is built up as follows: First a fascine mattress (in Dutch 'zinkstuk' and in English also sometimes called Dutch mattress) is placed on the bottom of the river at the location where the longitudinal groyne is to be built. The river bottom may be sandy or clayey or rocky. Fascine mattresses are a type of large mats specifically designed to protect the shorelines of rivers and estuaries against the erosive effect of running water. These mats/fascine mattresses consist essentially of geotextile and a grid of so called 'wieps' (bundles of brushwood woven together to form a very long sausage like shape) and have a width of 10-50 meters and a length of several hundreds of meters. The footprint of the fascine mattress underlayer is in general larger than the footprint of the dam body to be built on top of the fascine mattress. This fascine mattress is made on shore, then it is, as a floating mattress, transported to the location of the longitudinal groyne to be built, and subsequently sunk to the bottom at the location of the longitudinal groyne to be built by means of stones deposited onto the fascine mattress. This alone is a time-consuming operation with a lot of hindrance for shipping. Subsequently, a dam core of basically sand is made on the sunk fascine mattress. This dam core is covered with a filter construction, which in turn is covered with quarry-run, also called riprap or rubble. In order to be able to make a dam core of sand in the river, a protective temporary construction is required in order to prevent the dam core under construction from being flushed away by the river. Also this part of building the dam core and covering the dame core with a filter construction and quarry run to obtain the dam body, is a time-consuming operation with a lot of hindrance for shipping. Further, these longitudinal groynes have a slope grade of about 30% to 35%, i.e. the horizontal width of the slope is about 3 to 3.5 times the vertical height of the slope. When the longitudinal groyne has a height of for example 5 meters, the slope already requires 15 meters horizontal space on each longitudinal side of the longitudinal groyne. These longitudinal groynes thus reduce the navigation channel available for shipping considerably, which considerably reduces the applicability of longitudinal groynes in practice.

SUMMARY OF THE INVENTION

It is an object of the invention to provide an alternative longitudinal groyne. A further object of the invention is providing a longitudinal groyne overcoming one or more of the above problems.

C1: One or more of the above objects are according to a first aspect of the invention achieved by providing a river training structure which is placed in a river; wherein the river has a flow direction, a bank, and a navigation channel for shipping—in practise also known as ship channel—with a bottom; wherein the river training structure comprises a groyne placed in the river; wherein the groyne is a longitudinal groyne extending in flow direction of the river with water of the river along both longitudinal sides of the longitudinal groyne; wherein the river training structure comprises concrete blocks, each block being constituted by a central part and four or more legs extending from the central part such that the central part and legs define a three-dimensional configuration allowing a multiple of said blocks to inter-engage with each other three-dimensionally when stacked onto each other; wherein the longitudinal groyne is constructed from a multiple of said blocks irregularly stacked onto each other and engaging with each other to form a dam body of inter-engaging blocks, the dam body having a longitudinal slope at the navigation channel side of the dam body, which channel side slope slopes towards the bottom of the navigation channel.

The longitudinal groyne according to the invention consists of about only the multiple of said concrete blocks. These said blocks are of a type which is as such known for use as protective elements for breakwaters where these blocks are used as top cover layer placed on the slope of a breakwater construction. The inter-engaging characteristics of these blocks allows the longitudinal groyne to be constructed from basically only these blocks without a dam core or other constructional elements being required.

Further, in case soil material of the bottom of the river erodes or flushes away and creates a pit in the river bottom at a location under or adjacent the longitudinal groin, blocks from the longitudinal groyne will move to and into this the pit to fill it up as the blocks, though inter-engaging, are not un-moveably fixed relative to each other. With the structure according to the invention, the longitudinal groyne thus is a self-healing structure repairing itself in case of erosion. If necessary, additional blocks may simply be added later to supplement for blocks which moved into eroded pits. This is contrary to conventional longitudinal groynes which require about complete reconstruction of at least part of the longitudinal groyne instead of simply adding some rocks or stones. As erosion is no problem anymore because of the self-healing structure, a so called fascine mattress can be dispensed with.

In the river training structure according the invention, inter-engaging concrete blocks form a longitudinal groyne constructed from a multiple of said blocks irregularly stacked in the form of a longitudinal body having an about triangular or about truncated triangular cross-section. This cross-section is so to say filled up with said inter-engaging blocks.

The inter-engaging blocks used in the river training structure according to the invention, can be defined as constituted by a central part and four or more legs extending from the central part such that the central part and legs define a three-dimensional configuration allowing a multiple of said blocks to inter-engage with each other three-dimensionally when stacked onto each other. Examples of these inter-engaging blocks can for example be found in https://nl.wikipedia.org/wiki/Betonnen_golfbrekerelementen, see section 'in elkaar hakende elementen' and in https://en.wikipedia.org/wiki/Breakwater_(structure) see section 'breakwater armour units' mentioning several of these blocks and linking to a more general page 'wave dissipating concrete block' with links to several types of these blocks as well. More specific examples of inter-engaging blocks are:

- the so called Tetrapod™ as also depicted in FIGS. 1-2 of U.S. Pat. No. 2,766,592, which is basically a concrete block having a central portion with four (or five) protuberances thereon which radiate outwardly from the central part in a 3-dimensional pattern along four (or five) different axes that define substantially equal angles between these four (or five) axes;
- the so called Dolos™, which is basically a concrete element based on an H-shape, having one of the two vertical legs turned 90 degrees around the horizontal intermediate member of the H.
- the so called Accropod™ I, as also depicted in FIGS. 1 and 3 of U.S. Pat. No. 4,347,017 and Accropod™ II as also depicted in FIG. 1 of WO-00/56981; and
- the so called Xbloc™ of applicant as also depicted in for example FIGS. 2-4 of WO-2004/009910.

The Accropod™ and Xbloc™ both basically have a central part from which 3-pairs of two legs extend, the two legs of each pair extending in mutually opposite directions, and the length axes of the three pairs together defining an about orthogonal set of axes. Or said differently, in the Accropod™ and Xbloc™ the 6-legs radiate outwardly from the central part in a 3-dimensional pattern defining an orthogonal set of xyz-axes which (about) cross each other in the central part.

C2: According to a further embodiment of the first aspect of the invention, the longitudinal groyne may be placed at a distance from the bank. Doing so provides, on the bank side of the longitudinal groyne, a space for water which may be used recreational as it is safely separated from shipping in the navigation channel and/or as water storage in case of high water and/or as location where sediment may settle. In addition, water between the longitudinal groyne and bank may enhance biodiversity.

C3: According to another further embodiment of the first aspect of the invention, the longitudinal groyne may be placed on the edge of the navigation channel. Placing the longitudinal groyne on the edge of the navigation channel, keeps the navigation channel on the one hand as wide as possible, on the one hand, and promotes the water in the navigation channel flowing relatively fast preventing sediment from settling in the navigation channel.

C4: As a so called fascine mattress can be dispensed with, the dam body of inter-engaging blocks may, according to another further embodiment of the first aspect of the invention, wherein rest directly on a bottom of the river, which bottom may for example be a sand or clay bottom, i.e. a sandy or clayey bottom, which in conventional longitudinal groynes require a fascine mattress in order to prevent erosion and/or flowing away of bottom material.

C5: According to another further embodiment of the first aspect of the invention, the longitudinal groyne may be a construction consisting of about only said blocks.

C6: According to another further embodiment of the first aspect of the invention, the dam body of blocks has a further longitudinal slope at the bank side. Such a longitudinal slope on the bank side allows to dispense with support structures at the bank side because the slope of the longitudinal groyne at the bank side provides in itself sufficient lateral support to the longitudinal groyne.

C7: According to another further embodiment of the first aspect of the invention, wherein the slope at the navigation channel side of the longitudinal groyne may have a grade in the range of about 80% to about 120%, such as a grade in the range of about 90% to about 110% or a grade of about 100%. Conventional longitudinal groynes have a slope with a grade of about 30%. This is with the longitudinal groyne according to the invention, which is constructed from said inter-engaging blocks, possible as well. However laboratory experiments show that said inter-engaging blocks allow steep slopes with a grade between 80% and 120% whilst the longitudinal groyne is still sufficiently stable. With so called Xblocs™ a slope with a grade in the range of 90-110, such as about 100%, gives still a very stable longitudinal groyne. The steeper the slope, the less space is used by the longitudinal groyne and the more space is available for the navigation channel.

C8-9: According to another further embodiment of the first aspect of the invention, said three-dimensional configuration may define:
- a smallest bounding sphere with a radius in the range of about 15 to about 35 cm, such as a radius in the range of about 20 to about 25 cm or a radius of about 25 cm; and/or
- a smallest bounding cube (i.e. a regular hexahedron) with edges each having a length in the range of about 20 to about 50 cm, such as a length in the range of about 30 to about 40 cm or a length of about 25 cm.

Referring to Wikipedia—https://en.wikipedia.org/wiki/Smallest-circle_problem—the smallest-circle problem is the mathematical problem of determining the smallest bounding circle that contains all given points on a 2-dimensional plane or that contains a 2-dimensional object. Similar for a 3-dimensional object, like the inter-engaging blocks used in the invention—a smallest bounding sphere or a smallest bounding cube containing the object can be determined. Although the known inter-engaging elements used for breakwater structures are very large and heavy—having a smallest bounding sphere with a radius of about 1 meter or more—, it has been found that for river purposes the inter-engaging blocks may be much smaller. This facilitates transportation and manipulating these blocks considerable. Smallest bounding spheres with a radius of less than about 35 cm and/or smallest bounding cubes with an edge length of less than about 50 cm, allow construction of the longitudinal groyne by just dumping these blocks without requiring heavy equipment.

C10: According to another further embodiment of the first aspect of the invention, the blocks may be configured with dimensions allowing it to be dumped by a stone dumping vessel having one or more of: a side dumper, a hopper barge, clamshell crane.

C11: According to another further embodiment of the first aspect of the invention, the longitudinal groyne has an open, for example grid-like, structure allowing water to pass through the longitudinal groyne. The inter-engaging blocks used in the longitudinal groyne of the river training structure according to the invention, provide quite ample passages for allowing water to pass whilst also reducing dynamics of water when passing from the navigation channel into the longitudinal groyne. This makes the longitudinal groyne of the river training construction according to the invention very effective in case of high water conditions. On the one hand the longitudinal groynes allow high water to pass quickly as they serve essentially as a guide for the water flow instead of braking the water flow, and on the other hand surplus of water is allowed to pass through the longitudinal groyne reducing the pressure difference between opposing sides of the longitudinal groyne and consequently improving the resistance of the longitudinal groyne against dike failure, like dike burst.

C12: According to another further embodiment of the first aspect of the invention, the longitudinal groyne may have a length of more than 500 meters, such as 1000 meters or more.

C13: According to another further embodiment, the river training structure according to the first aspect of the invention may comprise a series of two or more of said longitudinal groynes placed in line with each other over a total length of more than 500 meters, like more than 1000 meter, and separated by water passages. Having water passages of say 5 meters up to say 20-30 metres or more in between two aligned longitudinal groynes facilitates water at the bank side of the longitudinal groyne being regularly refreshed and may also facilitate the water level at the bank side of the longitudinal groyne to follow the water level at the navigation side of the longitudinal groyne closely. The latter improving the resistance of the longitudinal groyne against dike failure, like dike burst.

C14: According to another further embodiment of the first aspect of the invention, the longitudinal groyne has a centre axis extending above and over end toe constructions of transverse groynes which extend or previously extended—in case the transverse groynes have been removed—from the bank transverse into the river. As the longitudinal groyne of the water training structure according to the invention does not require a fascine mattress as underlayer between the longitudinal groyne and the river bottom, the longitudinal groyne of the water training structure according to the invention may be located very close to the free ends of (previous) transverse groynes, on top of the end toes of these transverse groynes which comprise the part of the fascine mattress projecting from the free end of the transverse groyne in the direction of the navigation channel and may additionally comprise a part of the lower part of the slope at the free end of the transverse groyne.

C15: One or more objects of the invention, are according to a second aspect of the invention achieved by providing a system comprising:
  a river training structure according to the first aspect of the invention, and
  a river having a flow direction, a bank, and a navigation channel with a bottom.

C16: One or more objects of the invention, are according to a second aspect of the invention achieved by providing method for training a river and/or method for building a river training structure; wherein the method comprises the step of providing a longitudinal groyne in the river, which longitudinal groyne extends in flow direction of the river with water of the river along both longitudinal sides of the longitudinal groyne; wherein the longitudinal groyne provided comprises blocks, which are each constituted by a central part and four or more legs extending from the central part such that the central part and legs define a three-dimensional configuration allowing a multiple of said blocks to inter-engage with each other three-dimensionally when stacked onto each other; and wherein the longitudinal groyne is provided by dumping of a plurality of said blocks, for example directly onto the bottom of the river, to form a dam body, which in a still further embodiment may essentially consist about only of said blocks irregularly stacked onto each other and inter-engaging with each other; wherein the dam body has a longitudinal slope at the navigation channel side of the dam body and constitutes the said longitudinal groyne.

The effects and advantages of the method according to the third aspect of the invention have basically already been elucidated in relation to the first aspect of the invention. The fact that the longitudinal groyne for the river training structure according to the invention, may according to the second aspect of the invention be constructed by only and simply dumping the inter-engaging blocks at the location where the longitudinal groyne is desired to be built results a quite an amount of savings in time and money, and can in many cases be done without closing the navigation channel for shipping.

The further embodiments of the first aspect may according to the third aspect of the invention all be applied as further embodiment of the third aspect of the invention as well. Similar applies for the second aspect of the invention.

C17: According to a specific further embodiment of the third aspect of the invention, the blocks may be dumped on and along the edge of the navigation channel of the river to erect the longitudinal groyne on the edge of the navigation channel.

C18: According to a specific other further embodiment of the third aspect of the invention, in which the river to be trained comprises a series of transverse groynes extending from a river bank transverse into the river, each transverse groyne having at its river end an end toe construction; the blocks may be dumped along an imaginary line such that the longitudinal groyne obtained has a center axis extending over the end toe constructions of the transverse groynes and connecting the ends of the transverse groynes; and subsequently, after having provided the longitudinal groyne, the part of the transverse groynes projecting above the bottom of the river may at least partially be removed.

C19: According to a specific other further embodiment of the third aspect of the invention, the blocks may be dumped by a stone dumping vessel sailing in the navigation channel of the river.

C20: According to a specific other further embodiment of the third aspect of the invention, the blocks may be dumped such that the dam body obtained has at the navigation channel side of the dam body a slope with a grade in the range of about 80% to about 120%, such as a grade in the range of about 90% to about 110% or a grade of about 100%.

C21: According to a specific other further embodiment of the third aspect of the invention, said three-dimensional configuration defines
- a smallest bounding sphere with a radius in the range of about 15 to about 35 cm, such as a radius in the range of about 20 to about 25 cm or a radius of about 25 cm; and/or
- a smallest bounding cube (i.e. a regular hexahedron) with edges each having a length in the range of about 20 to about 50 cm, such as a length in the range of about 30 to about 40 cm or a length of about 25 cm.

C22: One or more objects of the invention, are according to a fourth aspect of the invention achieved by providing a use of inter-engaging concrete blocks to build a longitudinal groyne constructed from a multiple of said blocks irregularly stacked in the form of a longitudinal body having an about triangular or about truncated triangular cross-section, the blocks being of the type constituted by a central part and four, five, six, or more legs extending from the central part such that the central part and legs define a three-dimensional configuration allowing a multiple of said blocks to inter-engage with each other three-dimensionally when stacked onto each other.

BRIEF DESCRIPTION OF THE DRAWING

The invention will be explained further with reference to the drawings. In these drawings:

FIG. 3 schematically shows in top view (FIG. 3A) and in cross-section (FIG. 3B) a river provided with prior art transverse groynes.

FIG. 4 schematically shows the same river as in FIG. 3, FIG. 4 showing the river of FIG. 3 provided with river training structure with a longitudinal groyne according to the invention, FIG. 4A showing a top view and FIG. 4B showing a cross-section of the river.

FIG. 5 schematically shows the same river as in FIG. 3, FIG. 5 showing the river of FIG. 3 provided with a prior art longitudinal groyne, FIG. 5A showing a top view and FIG. 5B showing a cross-section of the river.

FIG. 9 shows schematically a Tetrapod™ as an example of an inter-engaging block which may be used in the invention, FIG. 9A showing a side view, FIG. 9B showing a perspective view on the underside of the block of FIG. 9A, and FIG. 9C showing a top view in vertical downward direction on the block of FIG. 9A.

DETAILED DESCRIPTION OF THE EMBODIMENTS

Figure 1A:
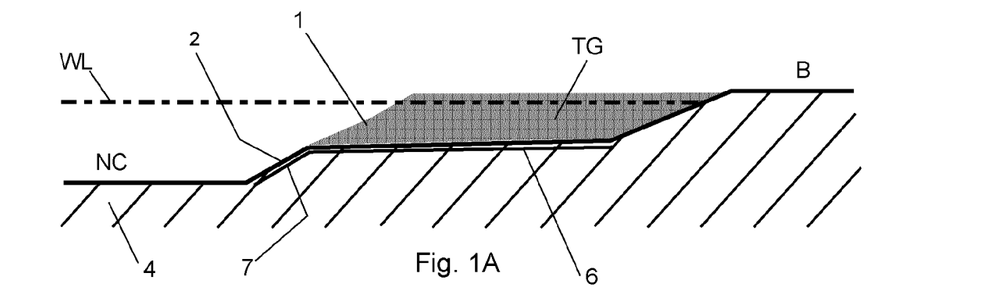
FIG. 1A schematically shows, in cross-section, a left part of a river provided with a prior art transverse groyne.

FIG. 1A shows in cross-section the right half of a river with a bottom 4, with a right bank B, and with a transverse groyne TG extending from the bank B to the navigation channel NC. As one can see, in this example the water level WL is at about the crest of the transverse groyne TG. The dam body of the transverse groyne TG is arranged on top of a fascine mattress 6. As can be seen, a part 7 of the fascine mattress 6 extends from the free end 1 of the transverse groyne transverse to the river in the direction of the navigation channel NC. This extending part 7 is part of the end toe construction 2 of the transverse groyne TG.

Figure 1B:
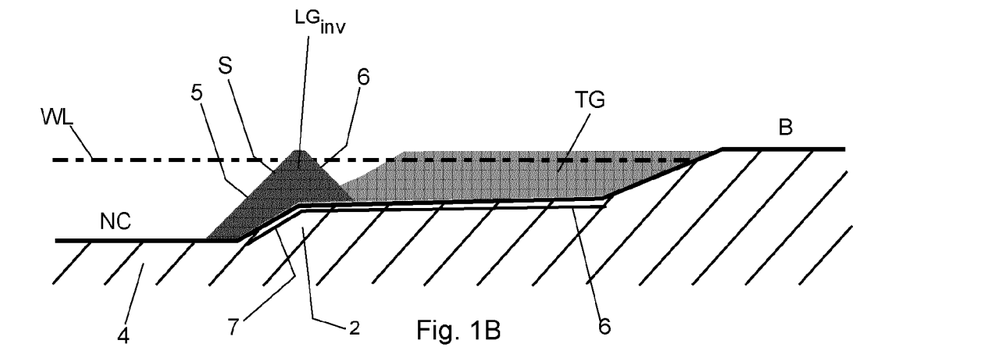
FIG. 1B shows the same schematical view as FIG. 1A, in which a river training structure with a longitudinal groyne according to the invention has been provided, the prior art transverse groyne still being present.

FIG. 1B shows the same view as in FIG. 1A, however a longitudinal groyne $LG_{inv}$ according to the invention has been added. The longitudinal groyne is shown in cross-section, the cross-section being transverse to the longitudinal direction of the longitudinal groyne $LG_{inv}$. The longitudinal groyne $LG_{inv}$ has a longitudinal side 5 facing the navigation channel NC, which side is called the navigation channel side 5. This navigation channel side has a slope S extending under an angle of 45° with respect to the horizontal, i.e. the slope S has a grade of 100%. The longitudinal groyne $LG_{inv}$ further has as a longitudinal side 6 facing the bank B, which side is called the bank side 6. As one can see in FIG. 1B, the longitudinal groyne $LG_{inv}$ is located on the edge of the navigation channel C on top of the extending part 7 of the fascine mattress 6.

Figure 1C:
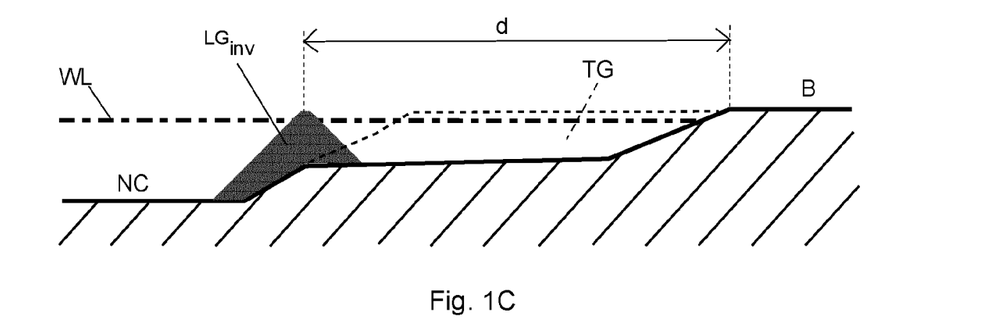
FIG. 1C shows the same schematical view as FIG. 1B, in which a river training structure with a longitudinal groyne according to the invention has been provided, and in which the prior art transverse groyne has been removed.

FIG. 1C shows the same view as in FIG. 1B after the transverse groyne has been removed. The former transverse groyne is still shown in dashed line.

Figure 2:
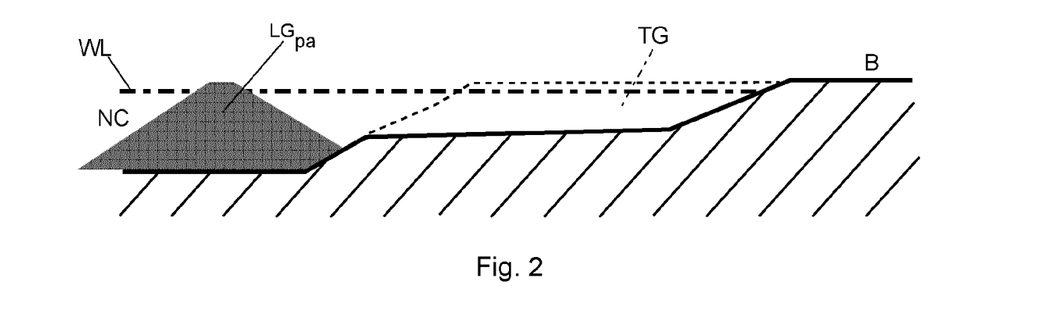
FIG. 2 shows a similar schematical view as FIG. 1C, in which however a prior art longitudinal groyne has been provided, and in which the prior art transverse groyne has been removed.

FIG. 2 shows a view similar as in FIG. 1C. The difference between FIG. 2 and FIG. 1C is that in FIG. 2 a longitudinal groyne $LG_{PA}$ according to the prior art has been shown. This prior art longitudinal groyne $LG_{PA}$ is placed on top of a fascine mattress (not shown) and has a slope with a grade of 30%, corresponding to an angle of about 20° with respect to the horizontal. Due to this small grade, the horizontal width of the prior art longitudinal groyne $LG_{PA}$ is quite large resulting in the width of the navigation channel being reduced considerably. With the longitudinal groyne $LG_{inv}$ according to the invention, the width of the navigation channel NC is hardly reduced, as can be seen in FIG. 1C. A further reason why the prior art longitudinal groyne $LG_{PA}$ is located at quite a distance from the previous transverse groyne TG, is due to the fascine mattress under the prior art longitudinal groyne $LG_{PA}$, which projects from both longitudinal sides and is hindered by the previous transverse groyne when this transverse groyne is still present at the moment of building the prior art longitudinal groyne $LG_{PA}$.

Figure 3A:
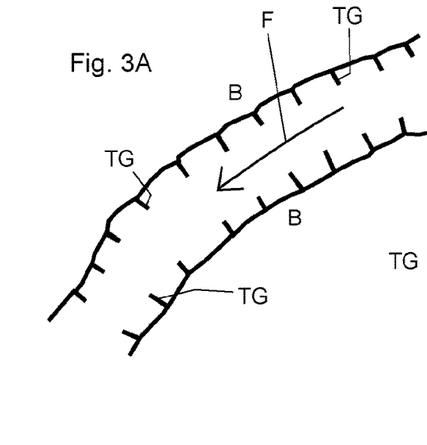
Figure 3B:
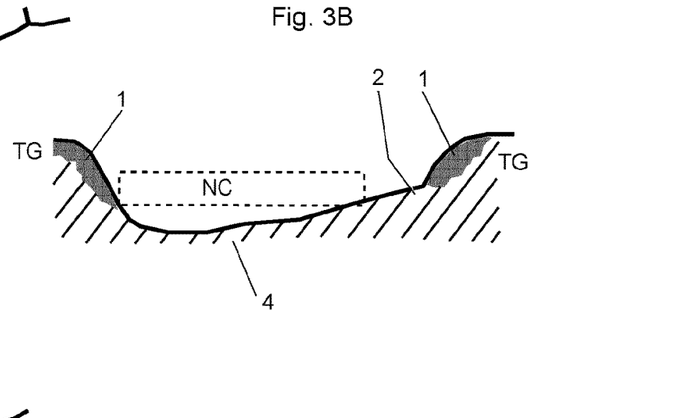

FIG. 3 shows a view similar to FIG. 1A. FIG. 3A shows a top view of a river having on both sides transverse groynes extending from the bank to the navigation channel. FIG. 3B shows a schematic cross-section of part of the river, about the part from the free end of one transverse groyne to the free end of an opposing transverse groyne, both free ends being included in the transverse section between the free ends 1 of the transverse groynes. In FIG. 3B the navigation channel NC has been indicated schematically with a dashed rectangle.

Figures 4A, 4B:
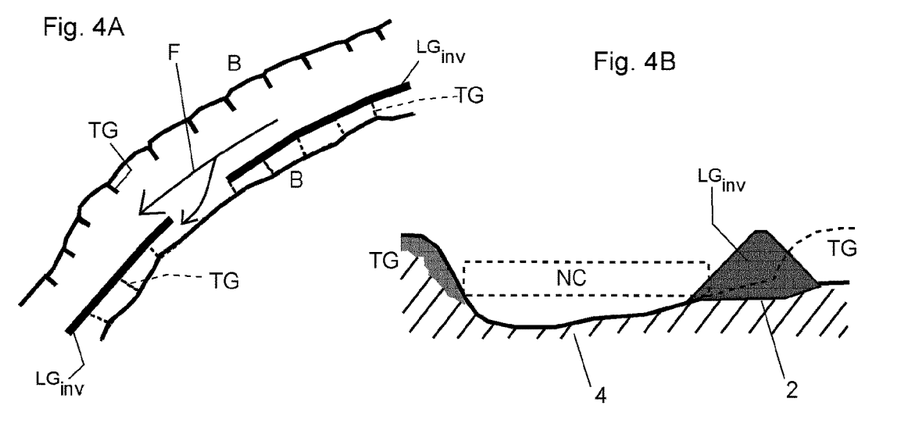

FIG. 4 shows the same views as FIG. 3, however now with a series of two longitudinal groynes $LG_{inv}$ according to the invention extending over the free ends of the previous transverse groynes at the inside bend of the river, i.e. the transverse groynes at the inside bend of the river have been removed, see FIG. 4A and FIG. 4B. It can be seen that the width of the navigation channel is hardly reduced. With respect to FIG. 4 it is noted, that although the longitudinal groynes $LG_{inv}$ according to the invention are shown as arranged on the inside bend of the river, arranging longitudinal groynes at the outside bend of the river is in general more efficient with respect to reducing erosion.

Figures 5A, 5B:
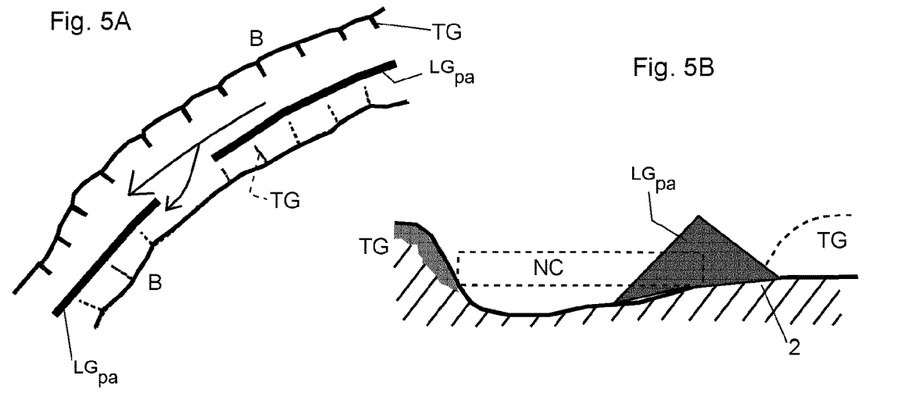

FIG. 5 shows the same views as FIG. 4, however in FIG. 5 a prior art longitudinal groyne $LG_{PA}$ has been used. As can be seen, both in FIG. 5A and in FIG. 5B, the prior art longitudinal groyne $LG_{PA}$ reduces the width of the navigation channel considerably for reasons already explained in relation to FIG. 2.

Figures 6, 7, 8:
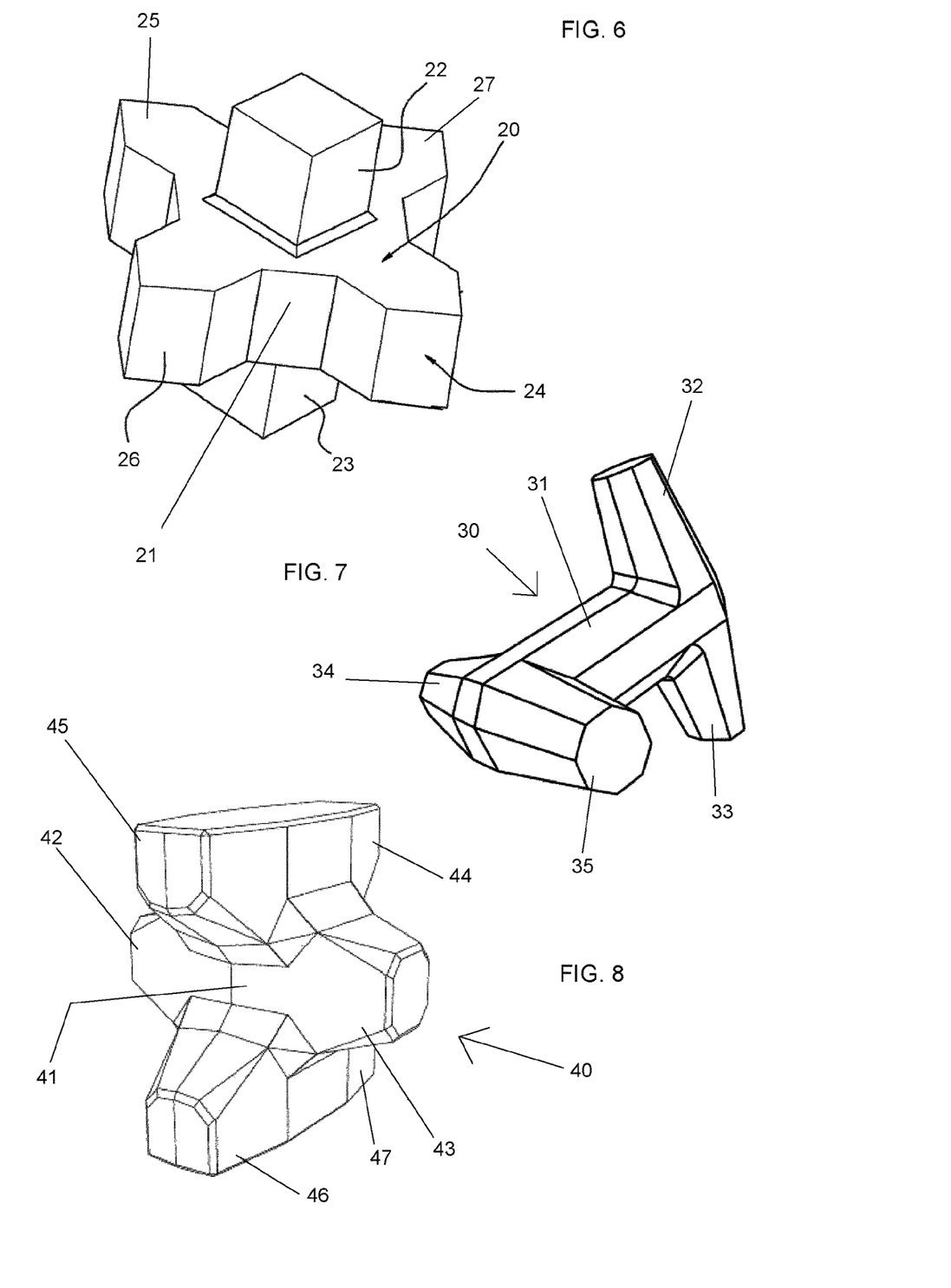
FIG. 6 shows schematically an Xbloc™ as an example of an inter-engaging block which may be used in the invention.
FIG. 7 shows schematically a Dolos™ as an example of an inter-engaging block which may be used in the invention.
FIG. 8 shows schematically an Accropod™ as an example of an inter-engaging block which may be used in the invention.

FIGS. 6-8 schematically show examples of inter-engaging blocks which may be in the river training structure according to the invention.

FIG. 6 shows a so called Xbloc™ 20 which is constituted by a central part 21 and six legs 22-27 extending from the central part such that the central part and legs define a three-dimensional configuration allowing multiple of said blocks to inter-engage each other three-dimensionally when stacked onto each other.

FIG. 7 shows a so called Dolos™ 30 which is constituted by a central part 31 and four legs 32-35 extending from the central part such that the central part and legs define a three-dimensional configuration allowing multiple of said blocks to inter-engage each other three-dimensionally when stacked onto each other.

FIG. 8 shows a so called Accropod™ 40 which is constituted by a central part 41 and six legs 42-47 extending from the central part such that the central part and legs define a three-dimensional configuration allowing multiple of said blocks to inter-engage each other three-dimensionally when stacked onto each other.

Figure 9A:
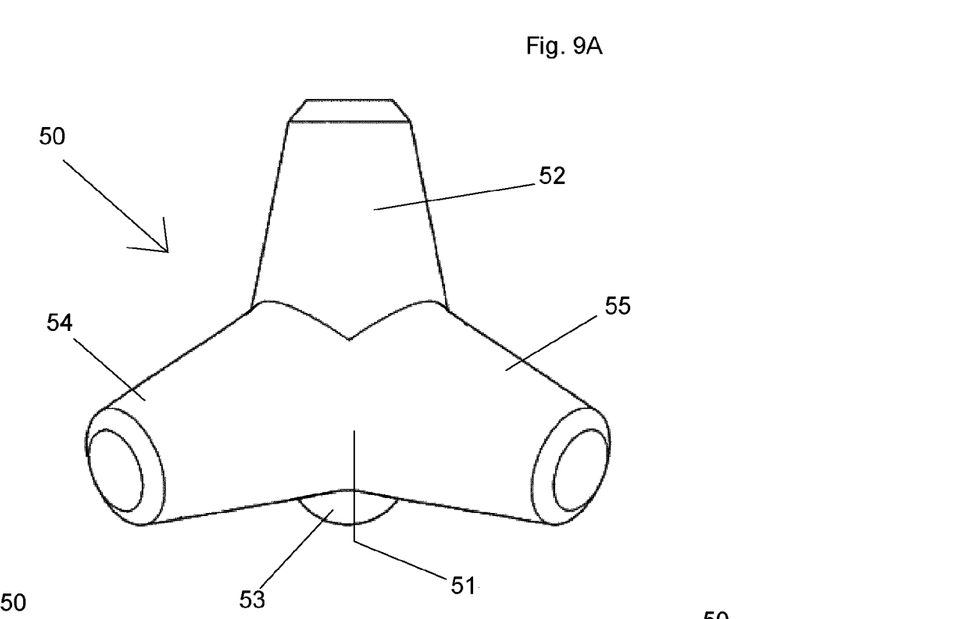
Figure 9B:
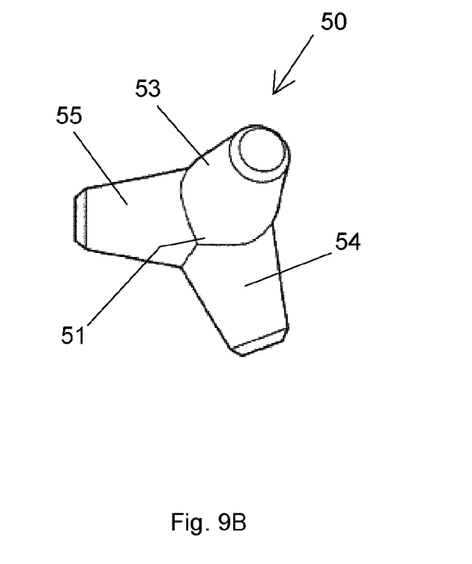
Figure 9C:
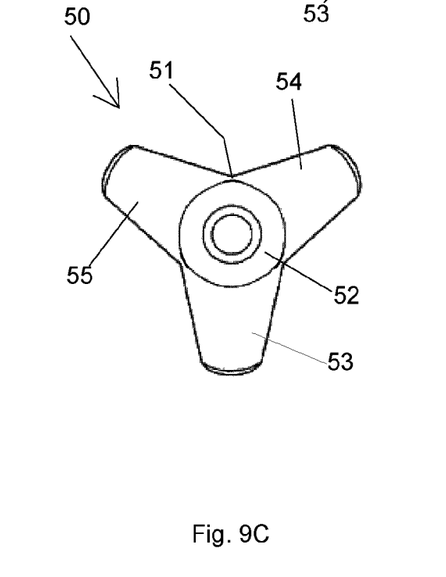

FIG. 9 shows a so called Tetrapod™ 50 which is constituted by a central part 51 and four legs 52-55 extending from the central part such that the central part and legs define a three-dimensional configuration allowing multiple of said blocks to inter-engage each other three-dimensionally when stacked onto each other.

The invention claimed is:

1. A river training structure for a river,
wherein the river has a flow direction, a bank, and a navigation channel with a bottom;
wherein the river training structure comprises a groyne placed in the river;
wherein the groyne is a longitudinal groyne extending in flow direction of the river with water of the river along both longitudinal sides of the longitudinal groyne;
wherein the river training structure comprises concrete blocks, each block being constituted by a central part and four or more legs extending from the central part such that the central part and legs define a three-dimensional configuration allowing a multiple of said blocks to inter-engage with each other three-dimensionally when stacked onto each other;
wherein the longitudinal groyne is constructed from a multiple of said blocks irregularly stacked onto each other and engaging with each other to form a dam body of inter-engaging blocks, the dam body having a longitudinal slope at the navigation channel side of the dam body.

2. The river training structure according to claim 1, wherein the longitudinal groyne is placed at a distance from the bank.

3. The river training structure according to claim 1, wherein the longitudinal groyne is placed on the edge of the navigation channel.

4. The river training structure according to claim 1, wherein the dam body of inter-engaging blocks rests directly on a sand or clay bottom of the river.

5. The river training structure according to claim 1, wherein the longitudinal groyne is a construction consisting of about only said blocks.

6. The river training structure according to claim 1, wherein the dam body of inter-engaging blocks has a further longitudinal slope at the bank side.

7. The river training structure according to claim 1, wherein the slope (/s) has (/have) a grade in the range of about 80% to about 120%.

8. The river training structure according to claim 1, wherein said three-dimensional configuration defines:
a smallest bounding sphere with a radius in the range of about 15 to about 35 cm; and/or
a smallest bounding cube with edges each having a length in the range of about 20 to about 50 cm.

9. The river training structure according to claim 1, wherein the blocks are configured with dimensions allowing it to be dumped by a stone dumping vessel having one or more of: a side dumper, a hopper barge, clamshell crane.

10. The river training structure according to claim 1, wherein the longitudinal groyne has an open structure allowing water to pass through the longitudinal groyne.

11. The river training structure according to claim 1, wherein the longitudinal groyne has a length of more than 500 meters.

12. The river training structure according to claim 1, comprising a series of two or more of said longitudinal groynes placed in line with each other over a total length of more than 500 meters and separated by water passages.

13. The river training structure according to claim 1, wherein the longitudinal groyne has a centre axis extending above and over end toe constructions of transverse groynes which:
extend or, in case the transverse groynes have been removed, previously extended from the bank transverse into the river.

14. A system comprising:
a river training structure according to claim 1, and
a river having a flow direction, a bank, and
a navigation channel with a bottom.

15. A method for training a river,
wherein the method comprises the step of providing a longitudinal groyne in the river, which longitudinal groyne extends in flow direction of the river with water of the river along both longitudinal sides of the longitudinal groyne;

wherein the longitudinal groyne provided comprises blocks, which are each constituted by a central part and four or more legs extending from the central part such that the central part and legs define a three-dimensional configuration allowing a multiple of said blocks to inter-engage with each other three-dimensionally when stacked onto each other; and wherein the longitudinal groyne is provided by dumping of a plurality of said blocks to form a dam body of said blocks irregularly stacked onto each other and inter-engaging with each other, the dam body having a longitudinal slope at the navigation channel side of the dam body.

16. The method according to claim 15,
wherein the blocks are dumped on and along the edge of the navigation channel of the river to erect the longitudinal groyne on the edge of the navigation channel.

17. The method according to claim 15,
wherein the river to be trained comprises a series of transverse groynes extending from a river bank transverse into the river, each transverse groyne having at its river end an end toe construction;

wherein the blocks are dumped along an imaginary line such that the longitudinal groyne obtained has a center axis extending over the end toe constructions of the transverse groynes and connecting the ends of the transverse groynes; and wherein, after having provided the longitudinal groyne, the part of the transverse groynes projecting above the bottom of the river is at least partially removed.

18. The method according to claim 15,
wherein the blocks are dumped by a stone dumping vessel sailing in the navigation channel of the river.

19. The method according to claim 15,
wherein the blocks are dumped such that the dam body obtained has at the navigation channel side of the dam body a slope with a grade in the range of about 80% to about 120%.

20. The method according to claim 15,
wherein said three-dimensional configuration defines
a smallest bounding sphere with a radius in the range of about 15 to about 35 cm; and/or
a smallest bounding cube with edges each having a length in the range of about 20 to about 50 cm.

* * * * *